(No Model.)

T. LEE.
APPARATUS FOR PRESERVING EGGS.

No. 269,866. Patented Jan. 2, 1883.

WITNESSES.
Wm. L. Goodwin
John P. Kerrigan

INVENTOR.
Thomas Lee
per Attys
Clifford & Clifford

UNITED STATES PATENT OFFICE.

THOMAS LEE, OF EAST LIVERMORE, MAINE, ASSIGNOR OF ONE-HALF TO ALVIN RECORD, OF SAME PLACE.

APPARATUS FOR PRESERVING EGGS.

SPECIFICATION forming part of Letters Patent No. 269,866, dated January 2, 1883.

Application filed July 31, 1882. (No model.)

*To all whom it may concern:*

Be it known that I, THOMAS LEE, of East Livermore, in the county of Androscoggin and State of Maine, have invented certain new and useful Improvements in Egg-Preservers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
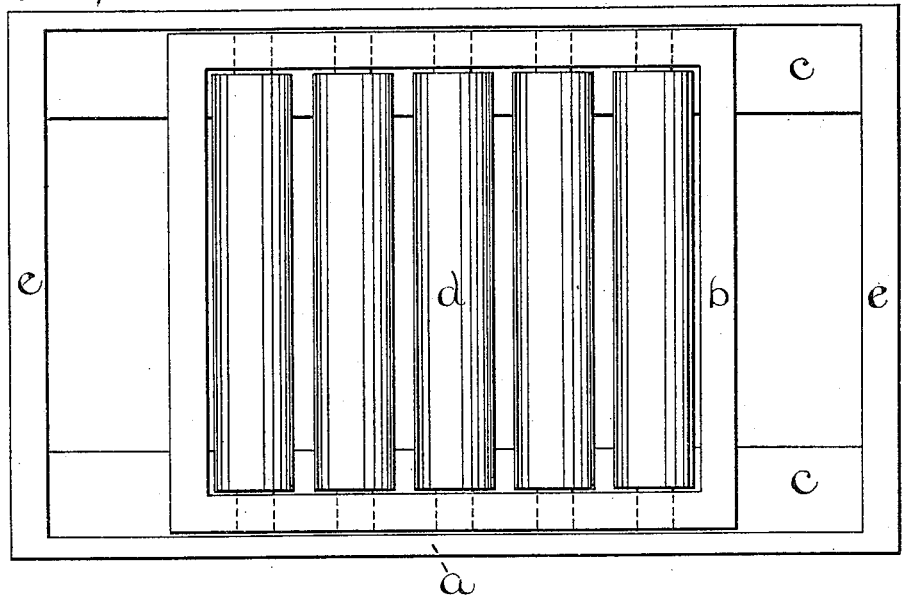
Figure 2:
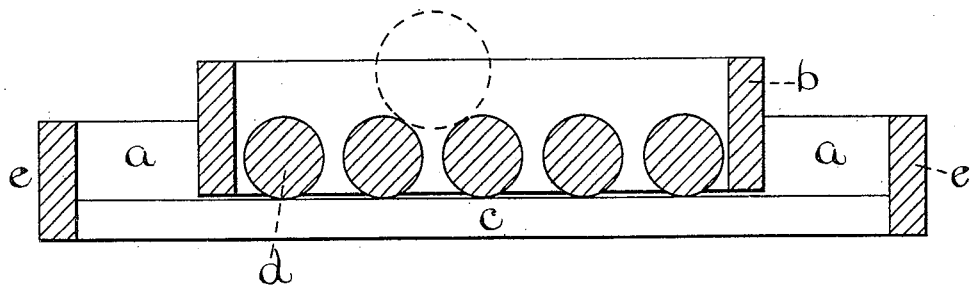

Figure 1 is a plan view. Fig. 2 is a sectional elevation.

Same letters show like parts.

My invention relates to devices for the preservation of eggs.

It consists in the combination of two frames, one of which is larger than the other, and somewhat longer, the larger one inclosing the smaller, furnishing a track for the smaller to move upon, the smaller one having rolls both to run on and turn the eggs, in the manner hereinafter described.

$a$ shows the lower and larger frame.

$b$ shows the upper smaller moving frame.

$c$ shows the tracks within the larger frame, and on the longer sides thereof, on which the shorter frame $b$ moves.

$d$ shows the rollers of the upper and smaller frame. These rollers are set in bearings in the sides of the upper frame, as seen in the drawings.

The end pieces, $e$, of the lower and larger frame limit the extent of the motion of the upper frame. The eggs are placed in the upper frame, upon and between the rollers, as illustrated in Fig. 2. The movement of the upper upon the lower frame produces rotation of the rollers, and thus a rotation of the eggs placed upon them. The extent of the motion of the upper frame is so regulated as to give, as nearly as possible, a half-revolution to the eggs when the upper frame is moved as far as the lower one will admit.

The device is intended for use where eggs are kept for sale, and also during their transportation.

This motion of the upper upon the lower frame is intended to give the egg a semi-revolution. When this is done with sufficient frequency the settlement of the yelk through the white is thus prevented, and the egg is thus preserved. These two frames can be made of any size to suit convenience. The under frame is to be made, when more than one pair is employed, with a lower projecting flange, so as to rest upon the upper edge of the larger frame of the pair next below and clear the moving frame. Thus a pile or stack can be used; or single pairs can be used.

What I claim as my invention, and desire to secure by Letters Patent of the United States, is—

In a device for preserving eggs by rotation, the combination of the lower frame, $a$, having tracks $c$, end pieces, $e$, and the flanges on the lower edge, with the frame $b$, having the rollers $d$, the latter resting within and moving upon the frame, and tracks $a$ and $c$, substantially as herein set forth.

In testimony that I claim the foregoing as my own I affix my signature in presence of two witnesses.

THOMAS LEE.

Witnesses:
 ALVIN RECORD,
 HELEN RECORD.